(12) United States Patent
Kamepalli et al.

(10) Patent No.: US 9,348,376 B2
(45) Date of Patent: May 24, 2016

(54) TABLET INFORMATION HANDLING SYSTEM DISPLAY STAND WITH FLEXIBLE POWER CONNECTION

(71) Applicant: Dell Products L.P., Round Rock, TX (US)

(72) Inventors: Srinivas Kamepalli, Austin, TX (US); John T. Morrison, Round Rock, TX (US); Travis C. North, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 13/932,162

(22) Filed: Jul. 1, 2013

(65) Prior Publication Data

US 2015/0002994 A1 Jan. 1, 2015

(51) Int. Cl.
*G09G 5/00* (2006.01)
*G06F 1/18* (2006.01)
*G06F 1/16* (2006.01)

(52) U.S. Cl.
CPC .............. *G06F 1/189* (2013.01); *G06F 1/1632* (2013.01)

(58) Field of Classification Search
CPC ....... G06F 1/1637; G06F 1/188; G06F 1/189; G06F 1/1632

USPC ........ 345/169; 455/575.8; 361/679.3, 679.41, 361/807
See application file for complete search history.

(56) References Cited

U.S. PATENT DOCUMENTS

| 4,508,860 | A | 4/1985 | Hawes | |
|---|---|---|---|---|
| 2012/0170212 | A1* | 7/2012 | Gallouzi | F16M 11/041 361/679.56 |
| 2012/0252543 | A1 | 10/2012 | Cho | |
| 2012/0270492 | A1 | 10/2012 | VanDerVeen et al. | |
| 2012/0303851 | A1* | 11/2012 | Tseng | G01C 21/265 710/303 |
| 2012/0327566 | A1 | 12/2012 | Pennington, Jr. et al. | |
| 2013/0050973 | A1 | 2/2013 | Rohrbach | |

* cited by examiner

*Primary Examiner* — Jennifer Nguyen
(74) *Attorney, Agent, or Firm* — Terrile, Cannatti, Chambers & Holland, LLP; Robert W. Holland

(57) ABSTRACT

A tablet information handling system has power contacts disposed on an outer surface of a planar housing to accept power from a power connector without affixing the power connector to the power contacts at the planar housing. For example, the power connector is disposed at a support surface of a stand in a position that aligns with power contacts of the planar housing when the planar housing rests on the support surface. The power connector provides power without a port or similar structure so that the planar housing may be place on and taken off the support surface at a variety of orientations rotated about the axis at which the power connector and power contacts meet.

19 Claims, 9 Drawing Sheets

TABLET INFORMATION HANDLING SYSTEM DISPLAY STAND WITH FLEXIBLE POWER CONNECTION

BACKGROUND OF THE INVENTION

1. Field of the Invention

The present invention relates in general to the field of information handling system display presentations, and more particularly to a tablet information handling system display stand with flexible power connection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations, such as a traditional clamshell configuration with an articulating lid, one of several convertible configurations that articulate a lid to a tablet-type of configuration, and a tablet configuration having a fixed display in a planar housing. Clamshell and convertible configurations include hinged portions that support a display in various viewing positions; by comparison, tablet information handling systems typically use a separate stand to hold a display in desired viewing positions. End users typically select portable information handling systems based upon size and processing capability. For example, smaller tablet configurations, such as smartphones sized for use as a handset, offer convenience and ready portability but reduced processing capabilities. By comparison, portable "all-in-one" systems are essentially a tablet with a relatively large housing that offers less portability but has adequate room to include relatively powerful processing capabilities.

Tablet information handling systems have grown in popularity due in part to their convenience, such as the ability to make inputs through a touchscreen display. End users tend to use tablet information handling system touchscreens for performing tasks that have few inputs, such as browsing the Web and reading e-mails, but tend to use separate keyboard peripherals for tasks that call for more inputs, such as composing documents. Generally, end users select tablet information handling systems based on the size of the display included in the planar housing, such as a display to provide adequate-sized images, versus the convenience associated with housings having a smaller size. Generally, end users tend to prefer tablet information handling systems to have as little weight and thickness as possible; however, end users will tend to select larger-sized tablet housings when a tablet is intended to perform more complex processing tasks, such as with a peripheral keyboard and mouse.

When using a tablet information handling system with a peripheral keyboard and mouse, end users sometimes use a display stand or similar device to hold the tablet so that the display is readily viewable. Tablet stands support the tablet information handling system in a viewable position and sometimes include a connector that interfaces the tablet with peripherals, such as keyboard, and with power. For example, a tablet information handling system power cable connector is disposed on a keyboard to accept the tablet information handling system, which is held in a desired viewing position by a support near the connector. As another example, a display stand includes a tablet power connector that secures the tablet information handling system in an elevated position above a desktop. In some instances, a keyboard interfaces with the tablet information handling system through wireless communication, such as Bluetooth. Although, in these examples, the connector typically secures the tablet information handling system in position to prevent the tablet from inadvertently falling, aligning and coupling the tablet information handling system and the connector sometimes presents difficulty to an end user, especially with light-weight, thin tablet systems having low-profile connectors. Similarly, end users often have difficulty removing a tablet from a stand where pulling the tablet out of the connector can lift the stand rather than separate the tablet from the connector. If an end user twists or otherwise places a rotational force on the connector when removing the tablet information handling system from the stand, damage can occur to the tablet and/or the stand.

SUMMARY OF THE INVENTION

Therefore a need has arisen for a system and method which couples a tablet information handling system in a stand in a manner that provides ease of alignment with a power connector and ease of removal of the tablet information handling system from the stand.

In accordance with the present invention, a system and method are provided which substantially reduce the disadvantages and problems associated with previous methods and systems for disposing an information handling system in a stand. Power contacts disposed at the outer surface of the information handling system housing align with a power connector disposed at a support surface to provide communication of power from the stand to the information handling system without affixing the information handling system to the stand.

More specifically, a tablet information handling system has a planar housing that contains processing components to process information and a display to present the information. Power contacts disposed along a portion of the planar housing accept power for use by the tablet information handling system by a physical touching with a power connector disposed in a support stand that holds the planar housing in a position for viewing of the display. The power contacts interface with the power connector to communicate power without affixing of the planar housing to the support stand by a physical constraining structure, such as a power port. The lack of a physical constraining structure associated with the power connector and power contacts allows an end user to rotate the planar housing about an axis through the power connector and power contacts interface without damage to the planar housing or stand. The stand includes a power port similar to that used by an external adapter of the information handling system so that the external adapter provides power to the stand, which is routed to the power connector.

The present invention provides a number of important technical advantages. One example of an important technical advantage is that a tablet information handling system secures to a stand with a power connector that provides power without physically constraining movement of the tablet information handling system relative to the stand. Contact points exposed at the housing of the tablet information handling system rest on a free floating connector disposed at the stand so that the weight of the tablet provides adequate force to ensure power transfer from the stand to the tablet information handling system. Power is provided to the stand connector by coupling a power cable of the tablet information handling system to the stand. Magnets align the free floating connector with the tablet contacts and bias the tablet information handling system into position to prevent inadvertent release from the stand. An end user places the tablet information handling system in position by simply resting the tablet housing in approximately the correct position on the stand and removes the tablet information handling system from the stand by lifting the tablet housing away from the stand. Since the power connector does not affix to the tablet, the end user can lift and twist the tablet housing along virtually any axis without damaging the free floating connector or tablet contacts.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system receives power from a stand power connector without affixing the power connector at power contacts exposed at a planar housing of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
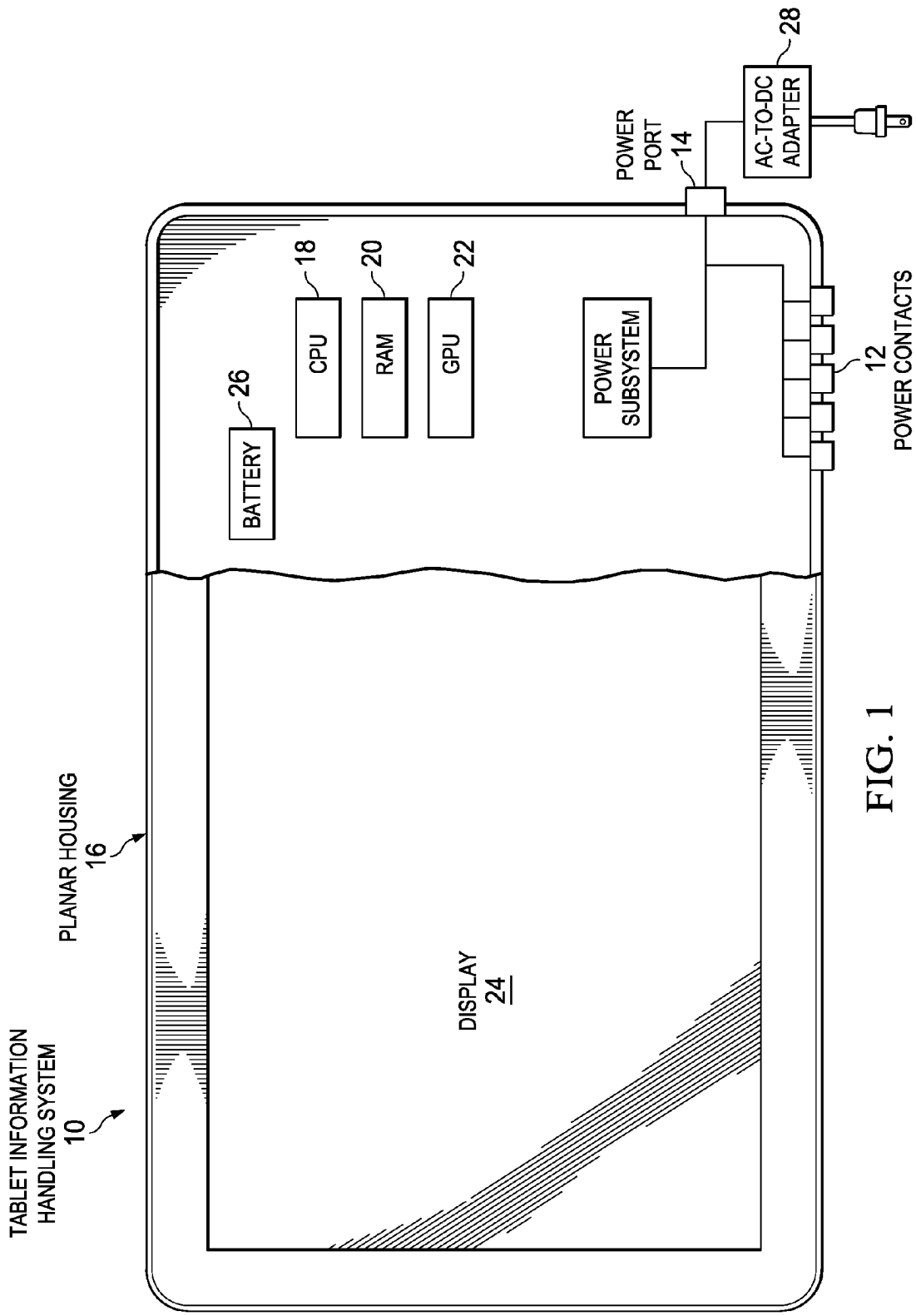
FIG. 1 depicts a tablet information handling system having power contacts and a power connector port disposed at a perimeter of a planar housing.

Referring now to FIG. 1, a tablet information handling system 10 is depicted having power contacts 12 and a power connector port 14 disposed at a perimeter of a planar housing 16. Tablet information handling system 10 contains processing components in planar housing 16 to process information. For example, a processor 18 executes instructions stored in a memory 20 to generate visual information that a graphics subsystem 22 processes to present visual images at a display 24. Display 24 is a touchscreen that accepts end user inputs as touches associated with displayed visual images, such as a virtual keyboard presented as an image that accepts key inputs made at the touchscreen. The processing components and display 24 disposed in planar housing 16 operate on DC power provided from an internal battery and/or external AC-to-DC power adapter 28, which provides power to power port 14 for powering processing components and charging battery 26. In addition, DC power may be applied at power contacts 12 to provide power for powering processing components and charging battery 26. For example, power contacts 12 are in electrical communication with power port 14 so that DC power applied to power contacts 12 is managed with the same logic as DC power applied at power port 14, such as a power manager executing on an embedded processor disposed in planar housing 16.

Figure 2:
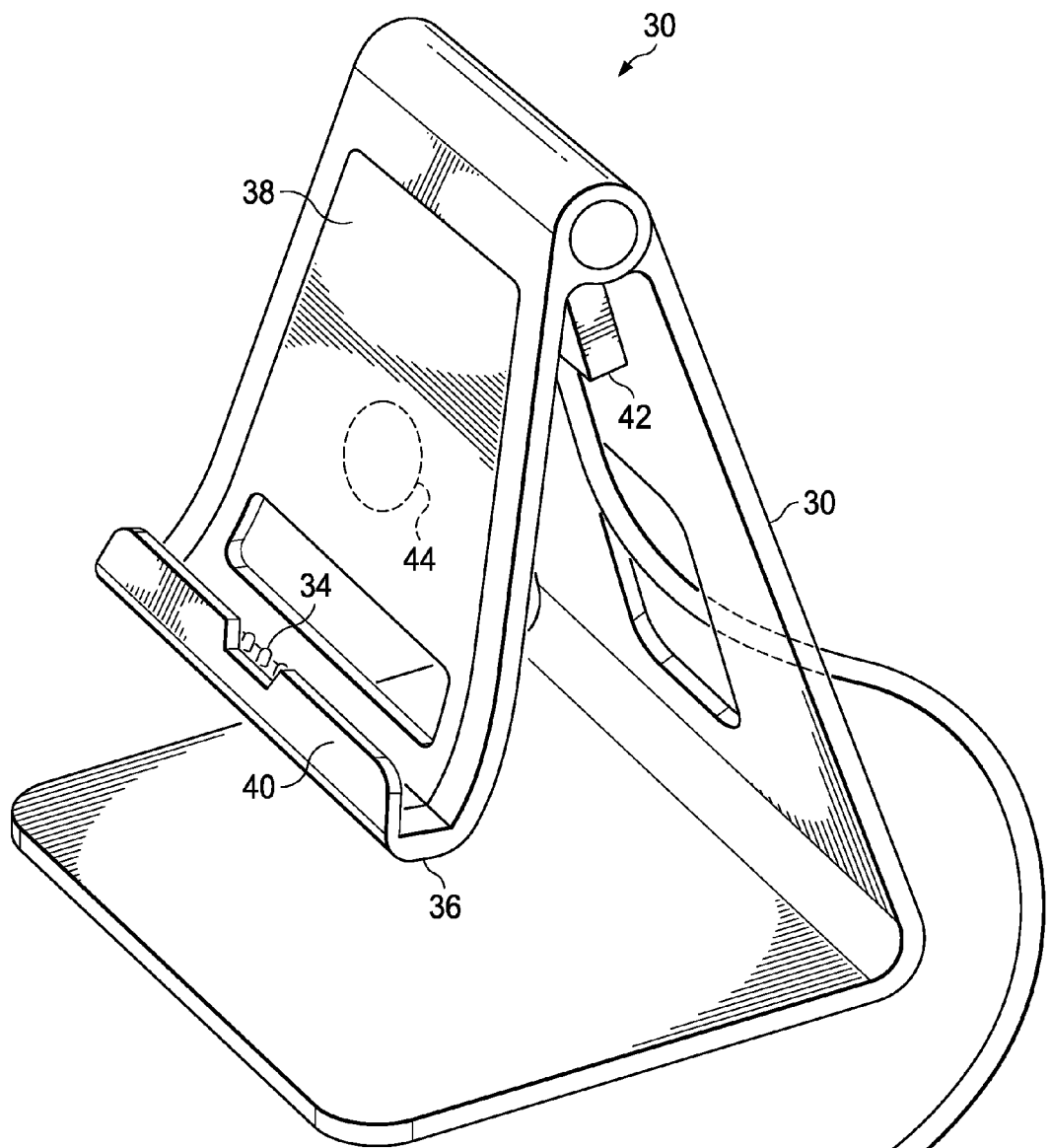
FIG. 2 depicts an upper side perspective view of a support stand having a support surface with a power connector for interfacing with power contacts exposed at a tablet information handling system.

Referring now to FIG. 2, an upper side perspective view depicts a support stand 30 having a support surface 32 with a power connector 34 for interfacing with power contacts 12 exposed at a tablet information handling system 10. Although the example embodiment depicts support stand 30 as supporting a tablet information handling system 10, in alternative embodiments, other types of information handling systems may be supported, or, alternatively, displays may be supported that present information as a peripheral to a separate information handling system. Support surface 32 maintains a tablet information handling system 10 in a raised position so that an end user may more easily view images presented at display 24. Support surface 32 includes a cradle portion 36 extending horizontally from a vertical surface 38. The perimeter of planar housing 16 rests on the horizontal part of cradle portion 36 while a lip 40 formed at the front of cradle portion 36 prevents planar housing 16 from inadvertently sliding out of cradle portion 36. A magnet 42 disposed in vertical surface 38 aligned to interact with a steel portion in planar housing 16 biases planar housing 16 against vertical surface 38.

Stand 30 provides power to tablet information handling system 10 without affixing to planar housing 16, such as with a conventional power plug and port configuration. In the example embodiment depicted by FIG. 2, power adapter 28 couples to a power port 42 disposed on the underside of stand 30 to provide DC power to stand 30. An internal power cable couples power port 42 with power connector 34 so that DC power and power adapter communications are communicated to power connector 34. Tablet information handling system 10 receives power and power adapter communications from power connector 34 when power contacts 12 rest on power connector 34 disposed on support surface 32. Power connector 34 and power contacts 12 communicate power and power adapter information by a physical interface maintained with the weight of tablet information handling system 10 on power connector 34. Power connector 34 does not affix with power contacts 12 or planar housing 16 in a socket or port configuration so that power connector 34 can disconnect and connect with power contacts 12 along a variety of different axes. For example, an end user can pull at the upper portion of a tablet information handling system 10 to rotate planar housing 16 along an axis running through the interface of power contacts 12 and power connector 34. Similarly, an end user can rest a tablet information handling system 10 on the lower surface of cradle portion 36 and slide planar housing 16 into position. The lack of a locking feature to affix power connector 34 and power contacts 12 provides an end user with flexibility in how planar housing 16 is placed onto and take off of support surface 32. Once power connector 34 and power contacts 12 align to communicate power, magnet 44 biases planar housing 16 towards vertical surface 38 to reduce the risk of inadvertent movement that could misalign power connector 34 and power contacts 12 but without undue restriction of motion of planar housing 16 relative to stand 30.

Figure 3:
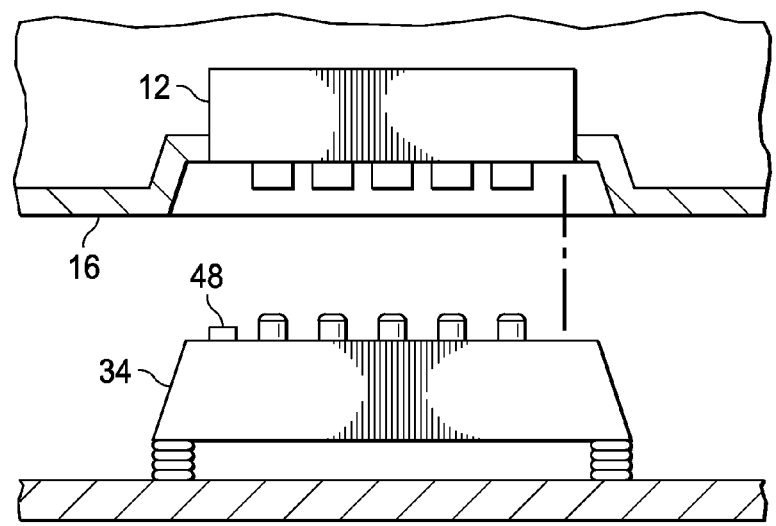
FIG. 3 depicts a side cutaway view of a tablet information handling system power contacts interfaced with a free floating support stand power connector.

Referring now to FIG. 3, a side cutaway view depicts tablet information handling system 10 power contacts 12 interfaced with a free floating support stand 30 power connector 34. In the example embodiment, power contacts 12 are disposed in a recess 46 formed in the perimeter of planar housing 16 that helps to guide planar housing 16 into a position with power connector 34 and power contacts 12 aligned to communicate power. Recess 46 provides adequate space relative to power connector 34 so that movement of planar housing 16 is not constrained by physical contact between planar housing 16 and power connector 34. Power connector 34 is mounted to support stand 30 in a free floating manner, such as with springs and bearings, so that a magnet 48 coupled to power connector 34 aligns power connector 34 with power contacts 12 with a biasing force exerted by a steel portion or another magnet disposed in planar housing 16. Thus, as tablet information handling system 10 is lowered into position on support surface 32, power connector 34 automatically aligns with power contacts 12. In one embodiment, power is not applied to power connector 34 from stand 30 until a predetermined amount of weight is placed on power connector 34 and a low power test confirms correct alignment. In the event of small movements of planar housing 16 relative to support surface 32, magnet 48 helps maintain communication of power by biasing power connector 34 into an aligned position with power contacts 12.

Figure 4:
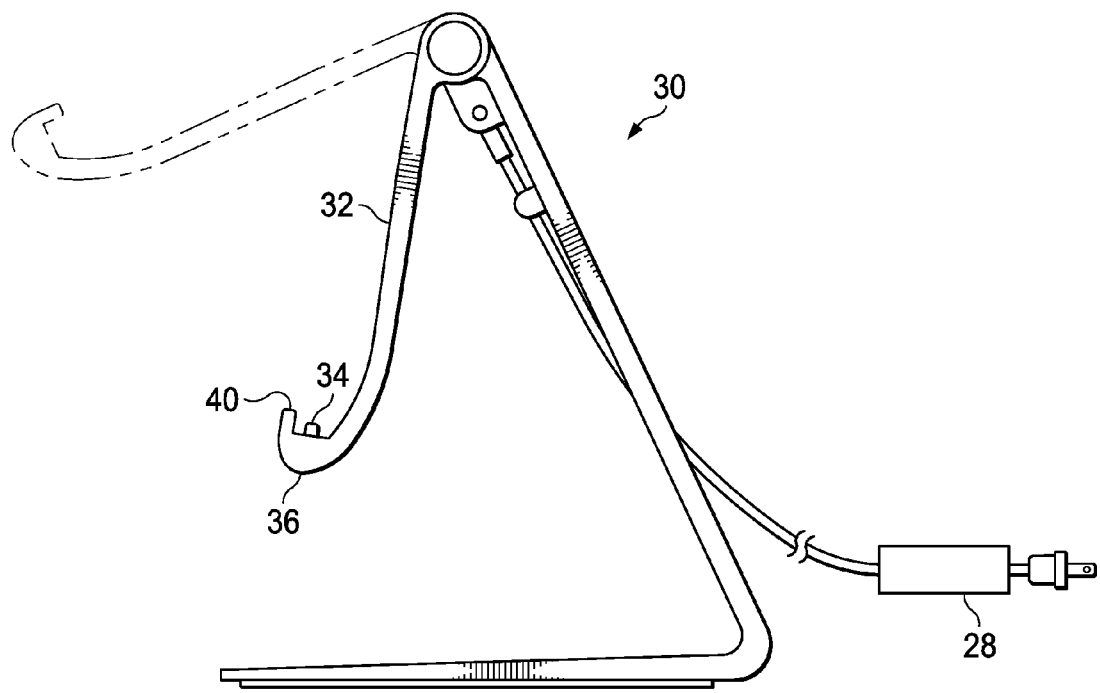
FIG. 4 depicts a side view of a stand with a power connector and in a variety of orientations for supporting a tablet information handling system 10.
Figure 4A:
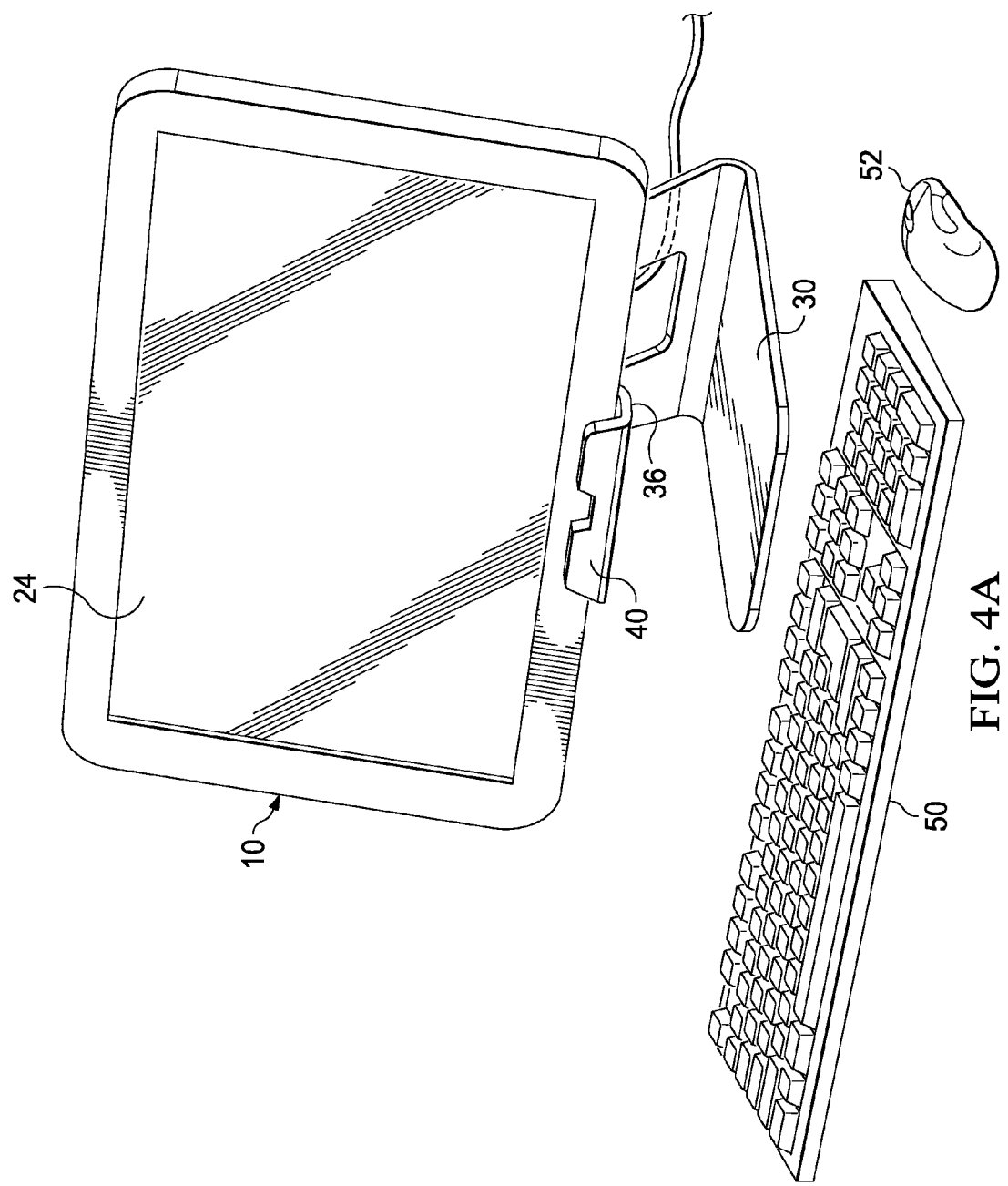
FIG. 4A depicts a tablet information handling system disposed in a support stand with a vertical surface in a substantially upright alignment.
Figure 4B:
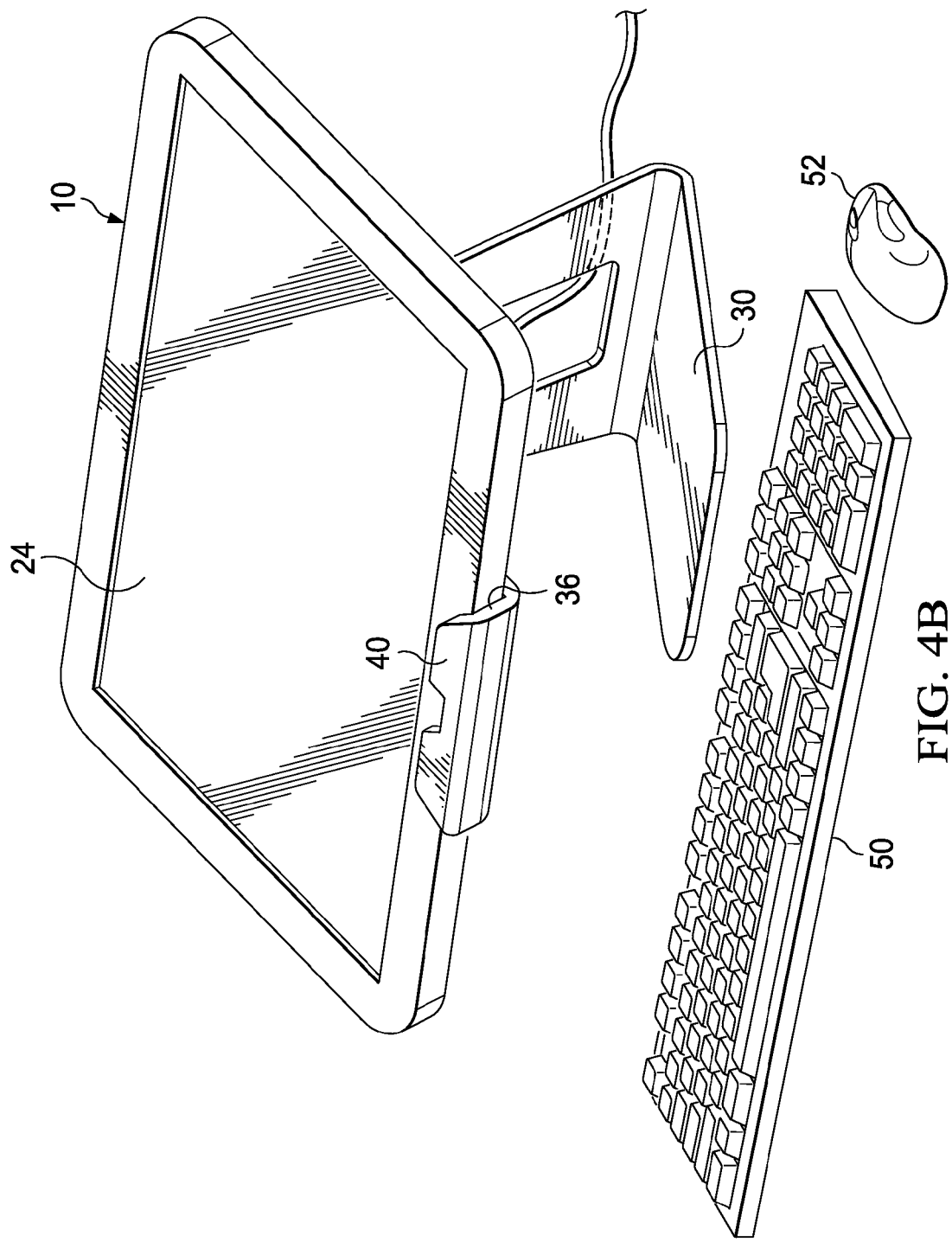
FIG. 4B depicts a tablet information handling system disposed in a support stand with a vertical surface in a substantially horizontal alignment.

Referring now to FIG. 4, a side view depicts stand 30 with power connector 34 and in a variety of orientations for supporting a tablet information handling system 10. In the example embodiment, support surface 32 rotates from a position with vertical surface 38 approximately ten degrees from vertical, such as for presenting a display to a sitting end user, to a position with vertical surface 38 approximately seventy degrees from vertical, such as for presenting a display to a standing end user. Cradle portion 36 and magnet 42 maintain tablet information handling system 10 in stand 30 to allow movement of the stand with forces translated through tablet information handling system 10. FIG. 4A depicts a tablet information handling system 10 disposed in support stand 30 with a vertical surface 38 in a substantially upright alignment, such as might be selected by an end user in a sitting position who is using tablet information handling system 10 with a wireless peripheral keyboard 50 and mouse 52. FIG. 4B depicts a tablet information handling system 10 disposed in support stand 30 with vertical surface 38 in a substantially horizontal alignment, such as might be selected by an end user in a standing position who is using tablet information handling system 10's touchscreen to make inputs.

Figure 5:
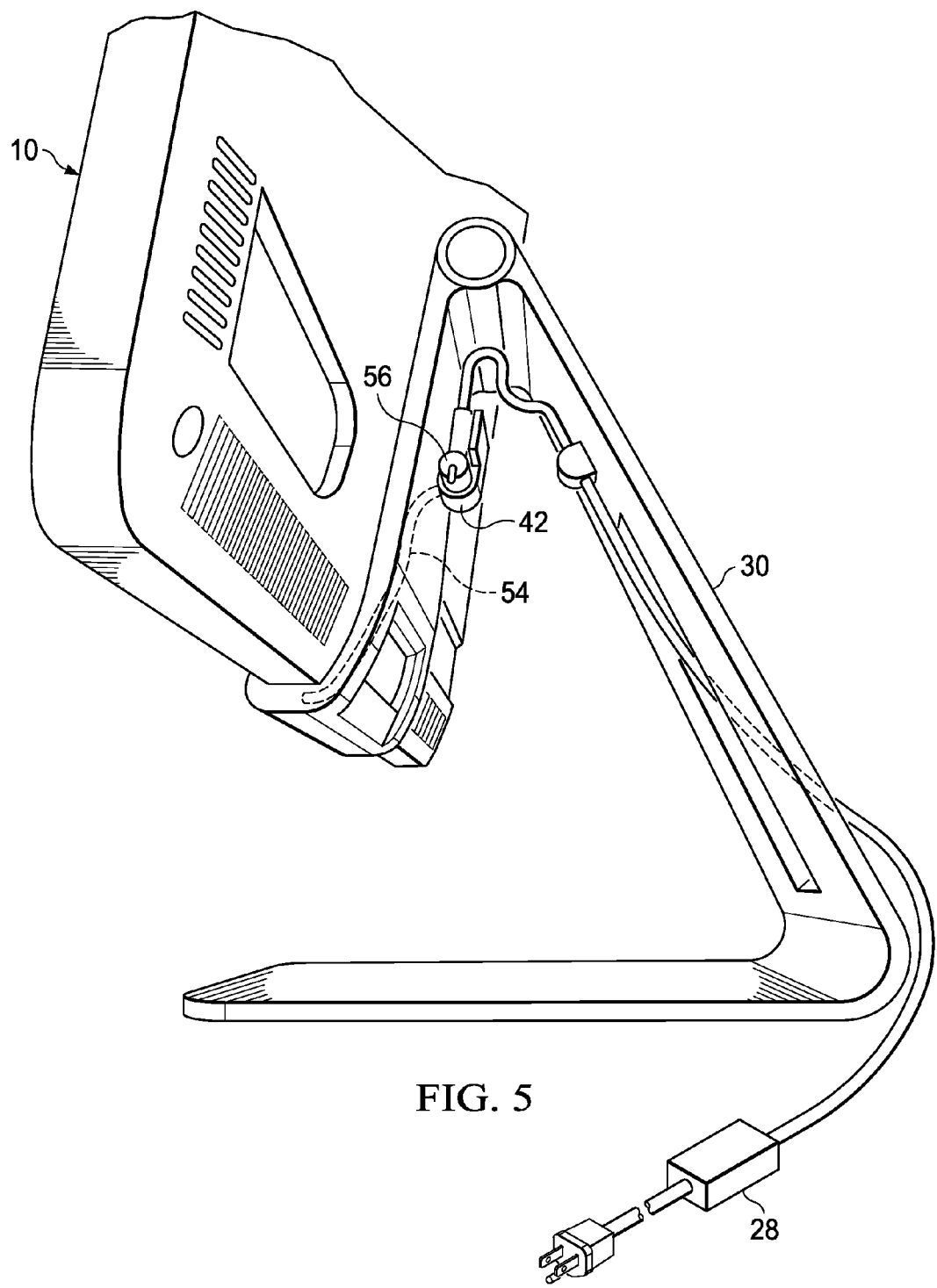
FIG. 5 depicts a lower rear perspective view of a tablet information handling system disposed in a support stand.

Referring now to FIG. 5, a lower rear perspective view depicts a tablet information handling system 10 disposed in a support stand 30. Power adapter 28 connects directly to a power port 42 disposed at the rear of support stand 30 to provide power through an internal power cable 54. When power contacts 12 of tablet information handling system 10 interface with power connector 34 to allow communication of power and information between tablet information handling system 10 and power adapter 28, an LED light 56 illuminates as an indicator to an end user. In alternate embodiments, power port 42 may be disposed in other locations of support stand 30 to limit the length of internal power cable 54, such as proximate to the power connector 34, or to make the coupling of adapter 28 more convenient for an end user, such as proximate to the rear lower surface of support stand 30.

Figure 6:
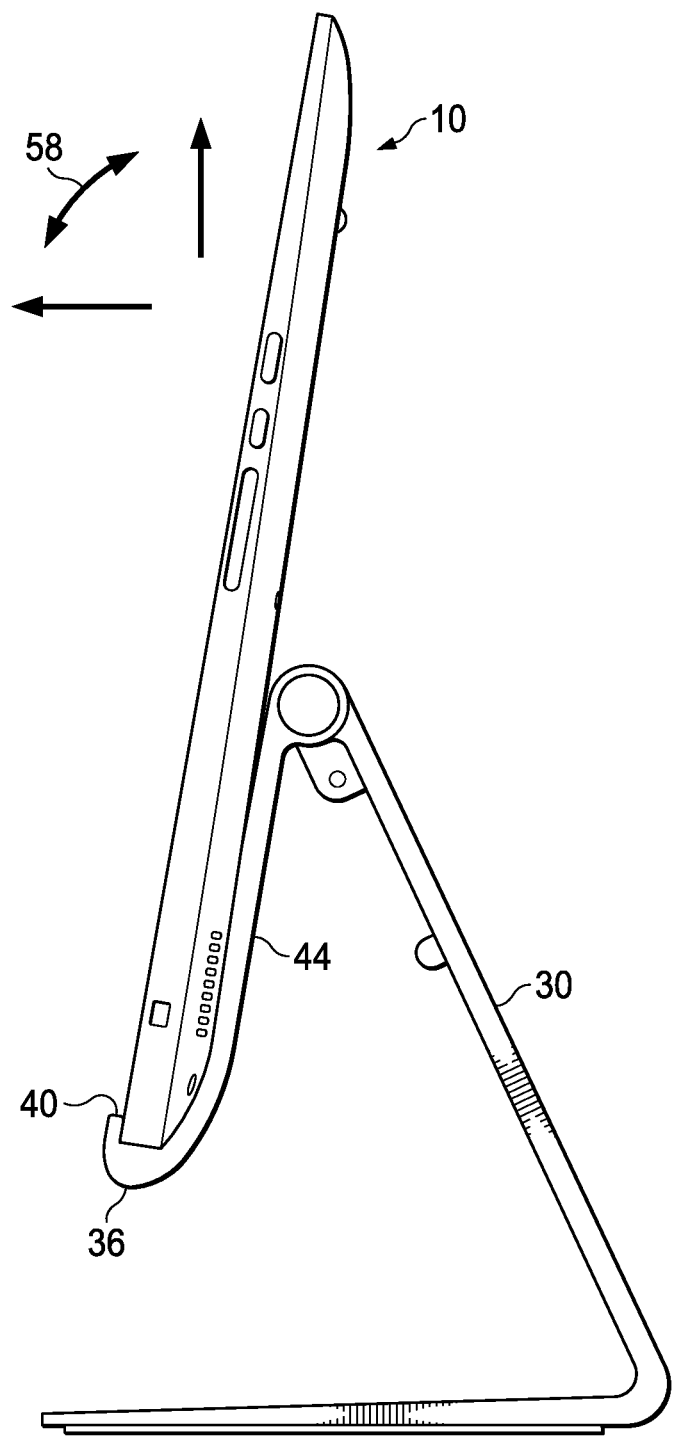
FIG. 6 depicts a side view of a range of insertion and removal vectors available for and end user of a tablet information handling system and support stand with a non-locking power interface.

Referring now to FIG. 6, a side view depicts a range of insertion and removal vectors available for and end user of tablet information handling system 10 and support stand 30 with a non-locking power interface. An end user may place tablet information handling system 10 into and remove tablet information handling system 10 from support stand 30 along any of a range of insertion/removal vectors 58 between horizontal and vertical orientations. In addition, an end user may slide tablet information handling system 10 relative to cradle portion 36 without causing damage to the power interface of power contacts 12 and power connector 34. Front lip 40 and magnet 42 maintain tablet information handling system 10 in support stand 30 when placed there by an end user until an end user exerts adequate force to overcome the bias into position created by magnet 42. In one embodiment, an end user pulls outward at the top portion of tablet information handling system 10 to rotate planar housing 16 about an axis running substantially through cradle portion 36 at the interface of power contacts 12 and power connector 34. Since power contacts 12 and power connector 34 are not affixed to each other or otherwise locked into position in a manner that limits motion of tablet information handling system 10 relative to support stand 30, no damage is caused to the power interface components by motion along the range of insertion/removal vectors 58.

End user are provided with a convenient support stand 30 that has convenient insertion and removal of a tablet information handling system 10 while powering the tablet information handling system when resting in the support stand. Power connector 34's slightly raised profile in cradle portion 36 aids alignment to ensure power communication without restricting system movement. Biasing magnets help to maintain the tablet information handling system 10 in place rather than a physically affixing structure co-located with the power interface, such as a conventional power connector plug and socket. Thus, no locking or guide pin mechanism is included for affixing the tablet information handling system 10 in the support stand 30. The absence of a lock or other affixing mechanism allows for removal of tablet information handling system 10 without damage to power interface or other components of either tablet information handling system 10 or support stand 30. Conventional support stands that include power connectors have guides that affix the power interface components so that an information handling system generally must be raised vertically before being lifted outward and removed; by comparison, the non-locking power interface of the present disclosure allows an end user to remove the tablet information handling system in a direction convenient to an end user. The viewing angle of the tablet information handling system conveniently changes with articulation between ten and seventy degrees with force applied at the top, side or bottom of the tablet information handling system 10 while it remains secure in support stand 30.

Figure 7A:
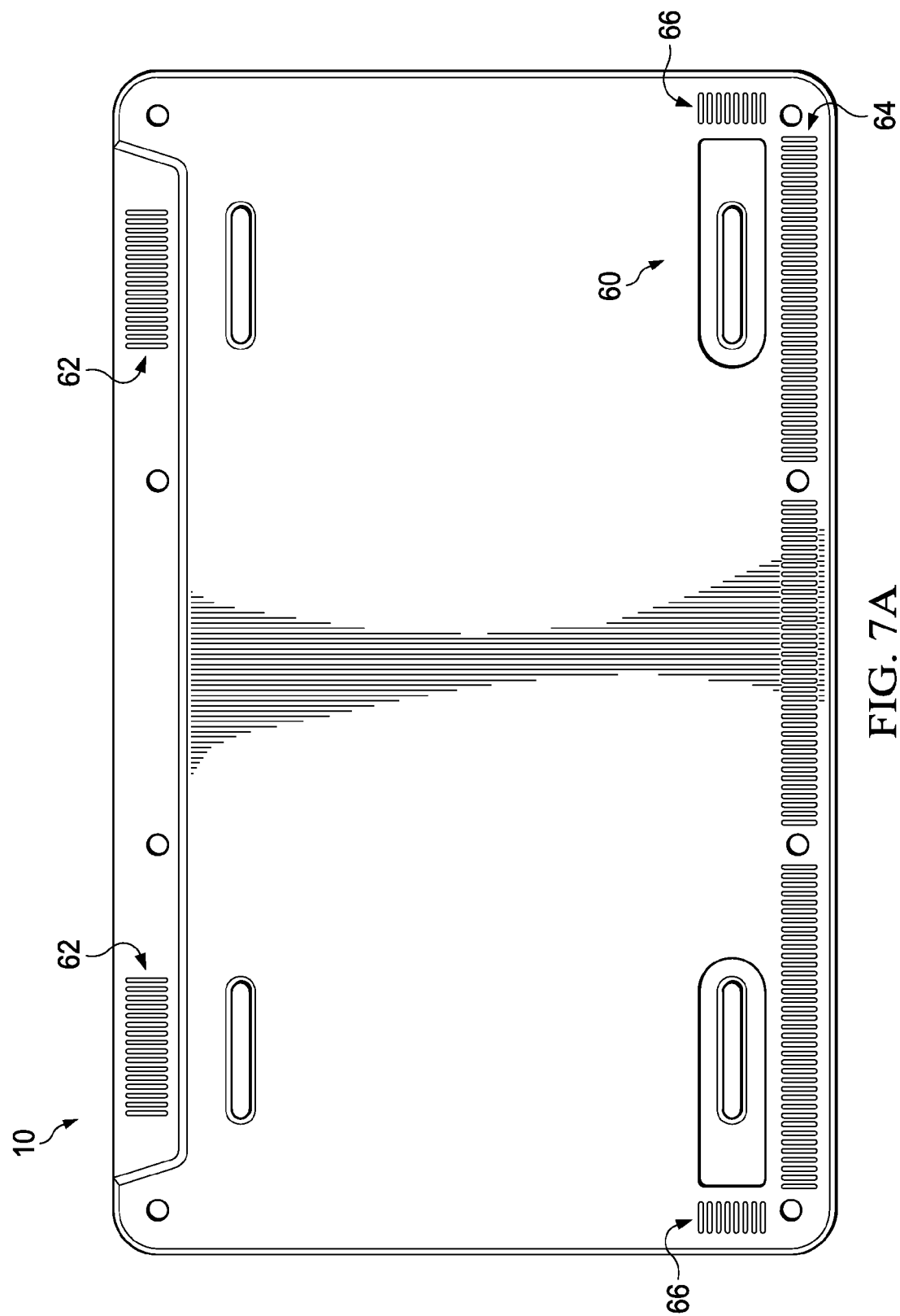
FIGS. 7A-7C, generally referred to as FIG. 7, depict a rear view of tablet information handling system having multi-zone venting for ensuring a cooling airflow.
Figure 7B:
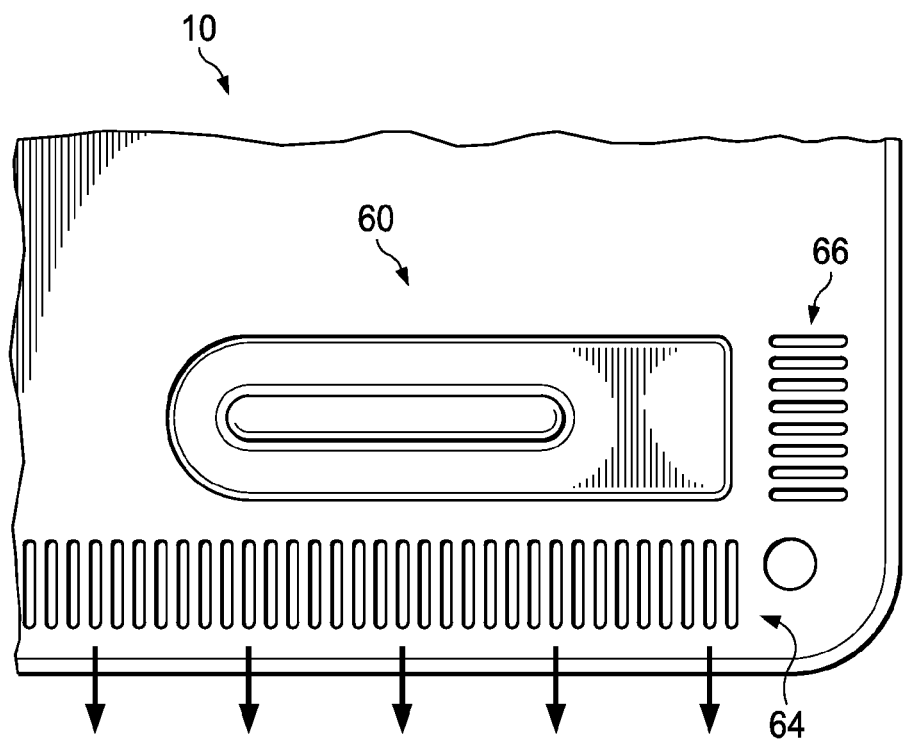
Figure 7C:
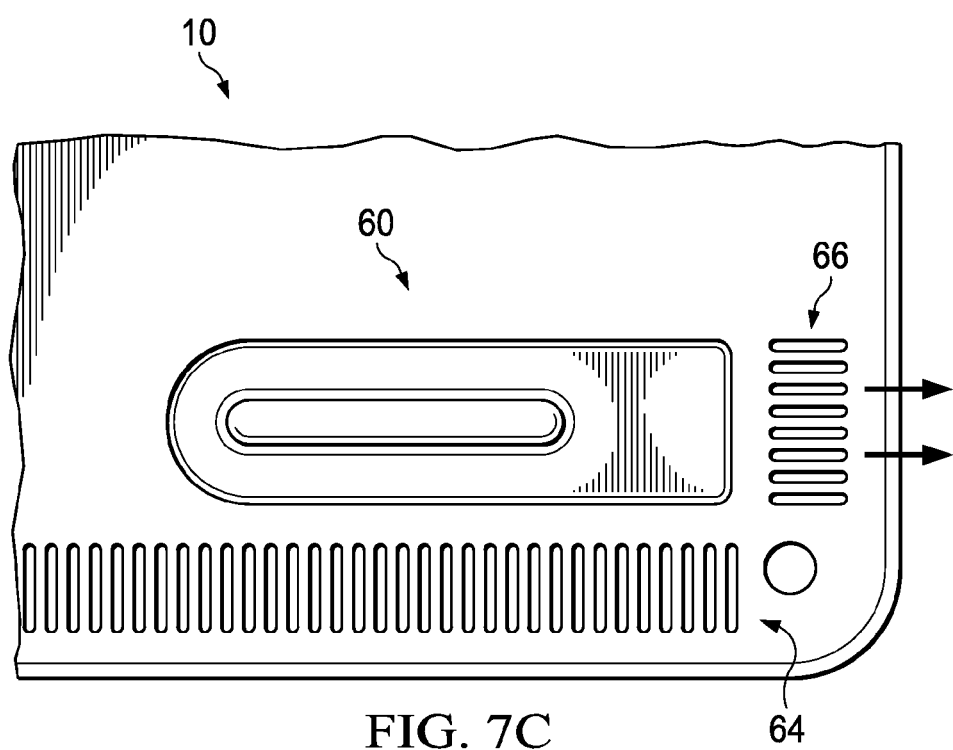

Referring now to FIG. 7, a rear view of tablet information handling system 10 depicts multi-zone venting for ensuring a cooling airflow. Internal cooling fans within planar housing 16 draw a cooling airflow through one or more inlets 62, pass the cooling airflow over internal components that have elevated thermal energy, such as a processor, and push the cooling airflow out multi-zone venting 60. Tablet information handling system 10 conveniently displays information in multiple orientations based upon how an end user is holding planar housing 16. For example, an end user may place tablet information handling system 10 in support stand 30 or may hold tablet information handling system 10 by a side or in the end user's lap. If an end user blocks an outlet, then inlet 62 is unable to provide a full cooling airflow to cool internal components and system performance may be reduced in order to reduce the amount of thermal energy that is internally generated. Multi-zone venting 60 reduces the impact of restricted airflow by offering an upper outlet vent 66 and a lower outlet vent 64 to allow cooling airflow to escape from within planar housing 16. In one embodiment, cooling airflow is biased towards lower vent 64 so that upper vent 66 has minimal airflow through it unless lower vent 64 is blocked. In an alternative embodiment, dampers may be activated based upon a detected orientation or tablet information handling system 10, such as orientation detected by an accelerometer. Support stand 30 includes an opening in vertical surface 38 that provides a path for a cooling airflow to proceed from lower vent 64. In a docked configuration, the opening in vertical surface 38 provides a path for cooling airflow to exit from the rear of housing 16 through the middle of support stand 30 and away from an end user.

Although the present invention has been described in detail, it should be understood that various changes, substitutions and alterations can be made hereto without departing from the spirit and scope of the invention as defined by the appended claims.

What is claimed is:

1. An information handling system comprising:
a planar housing;
a processor disposed in the planar housing and operable to process information;
memory disposed in the planar housing and interfaced with the processor, the memory operable to store the information; and
a display disposed in the planar housing and interfaced with the processor, the display operable to present the information as visual images;
power contacts disposed at an outer surface of the planar housing, the power contacts operable to accept power from an external power source and provide the power to run the processor, memory and display; and
a stand having a support surface to support the planar housing in an elevated position, the support surface having a power connector aligned to interface with the power contacts, the power connector providing power to the power contacts with the planar housing unlocked relative to the support surface;
an adjusting portion coupled with the power connector and operable to allow lateral movement of the power connector relative to the support surface; and
a magnet associated with the adjusting portion and operable to bias the power connector and power contacts into alignment.

2. The information handling system of claim 1 wherein:
the support surface comprises a cradle portion having a lip and a vertical surface, the vertical surface extending upwards from the cradle portion and aligned so that a back surface of the planar housing rests against the vertical surface when the planar housing rests in the cradle portion; and
the planar housing unlocked relative to the support surface comprises spacing between the cradle portion and planar housing proximate the power connector and power contacts adequate to pull the planar housing back surface away from the vertical surface rotating about the power connector.

3. The information handling system of claim 2 further comprising:
a magnet disposed in the vertical surface; and
a steel portion disposed in the planar housing to align with the magnet when the planar housing rests in the cradle portion with the power connector interfaced with the power contacts, the magnet biasing the planar housing against the vertical surface.

4. The information handling system of claim 1 wherein:
the support surface comprises a cradle portion having a lip and a vertical surface, the vertical surface extending upwards from the cradle portion and aligned so that a back surface of the planar housing rests against the vertical surface when the planar housing rests in the cradle portion; and
the planar housing unlocked relative to the support surface comprises spacing between the cradle portion and planar housing proximate the power connector and power contacts adequate to slide the planar housing relative to the cradle portion while the planar housing is in physical contact with the cradle portion.

5. The information handling system of claim 1 further comprising:
an external power adapter operable to convert alternating current to direct current and provide the direct current to a power port disposed at the planar housing;
a power port disposed in the stand and operable to accept the direct current from the external power adapter; and
a power cable integrated in the stand and operable to communicate the direct current power from the power port to the power connector.

6. The information handling system of claim 1 wherein the power connector has a raised surface relative to the support surface and the planar housing has a recessed surface to aid alignment of the power connector with the power contacts without affixing the planar housing to the support.

7. The method of claim 6 wherein the power connector withholds power from the power contacts unless the planar housing provides at least a predetermined force against the power contacts.

8. A method for providing power to a planar housing supported in a stand, the method comprising:
aligning power contacts of the planar housing with a power connector disposed in a support surface of the stand;

resting the planar housing on the support surface to place the power contacts in electrical communication with the power connector;

communicating power from the power connector to the power contacts;

wherein the power connector interfaces with the power contacts without restricting motion of the planar housing relative to the support surface;

floating the power connector relative to the support surface; and biasing the power connector to align with the power contacts as the planar housing approaches the support surface.

9. The method of claim 8 further comprising rotating the planar housing relative to the stand about an axis at the interface of the power connector and power contacts to remove the planar housing from the stand.

10. The method of claim 8 wherein biasing comprises disposing magnets proximate the power connector and power contacts, the magnets interacting to move the power connector in alignment with the power contacts.

11. The method of claim 8 further comprising restricting motion of the planar housing relative to the support surface with a magnet disposed in the stand distal the power connector.

12. The method of claim 8 further comprising rotating the planar housing relative to the stand about an axis proximate to the interface of the power connector and power contacts.

13. The method of claim 8 further comprising:
coupling a power adapter to a power port of the stand;
communicating power from the power adapter to the power port and through a power cable integrated in the stand to the power connector.

14. A method for communicating power to an information handling system, the method comprising:
communicating power through a stand to a power connector disposed on a support surface of the stand;
floating the power connector laterally relative to the support surface; and
biasing the power connector to align with power contacts as the information handling system approaches the support surface;
resting the information handling system on the support surface with power contacts of the information handling system aligned with the power connector; and
applying the weight of the information handling system to maintain the power connector and power contacts in electrical communication for communicating power.

15. The method of claim 14 wherein applying the weight further comprises communicating power without affixing the power connector and power contacts to each other.

16. The method of claim 14 wherein applying the weight further comprises floating the power connector free to move relative to the stand.

17. The method of claim 16 further comprising biasing the power connector to align with the power contacts as the information handling system rests on the support surface.

18. The method of claim 14 wherein applying the weight further comprises communicating power without affixing the information handling system and stand to each other.

19. The method of claim 14 further comprising:
blocking a cooling fan outlet at a portion of the information handling system; and
in response to the blocking, directing cooling airflow to an alternative outlet.

* * * * *